Figure 1:
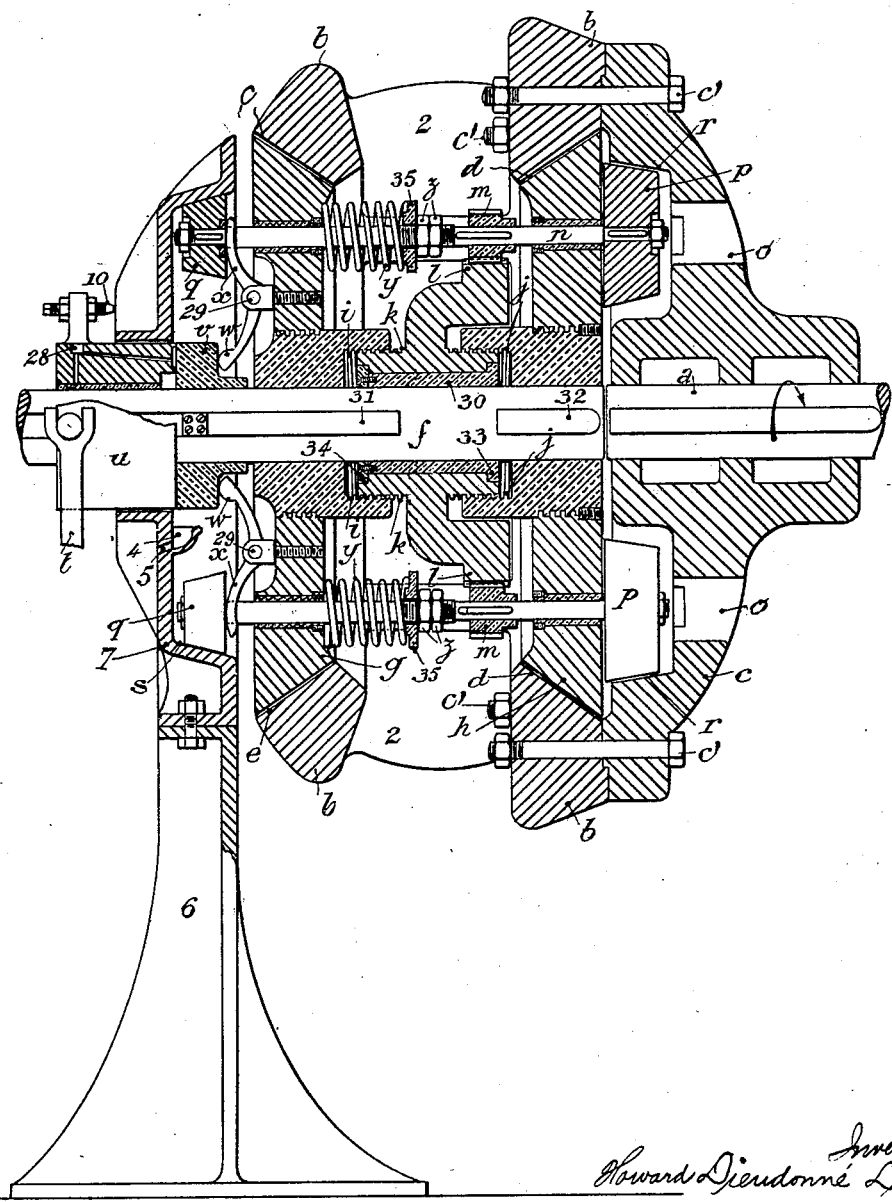

No. 714,209. Patented Nov. 25, 1902.
H. D. LORIA.
FRICTION CLUTCH OR COUPLING.
(Application filed Aug. 12, 1901.)

(No Model.) 2 Sheets—Sheet 1.

No. 714,209. Patented Nov. 25, 1902.
H. D. LORIA.
FRICTION CLUTCH OR COUPLING.
(Application filed Aug. 12, 1901.)
(No Model.) 2 Sheets—Sheet 2.
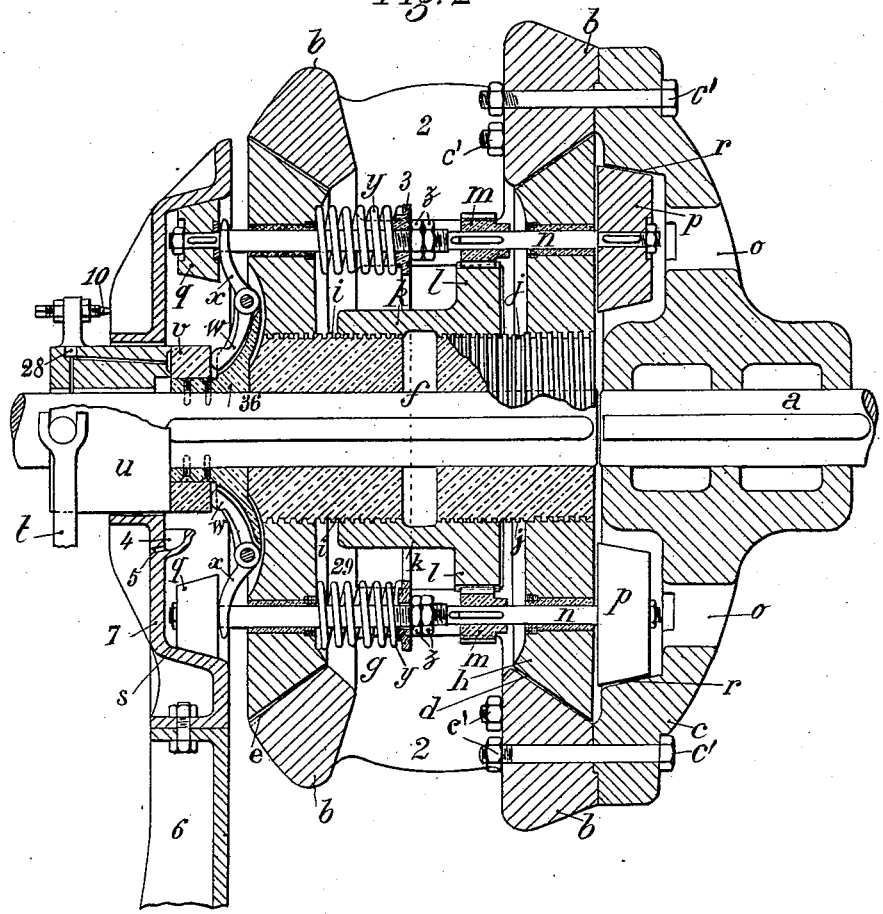
Inventor,
Howard Dieudonné Loria.

UNITED STATES PATENT OFFICE.

HOWARD DIEUDONNÉ LORIA, OF ORCHAMPS, FRANCE.

FRICTION CLUTCH OR COUPLING.

SPECIFICATION forming part of Letters Patent No. 714,209, dated November 25, 1902.

Application filed August 12, 1901. Serial No. 71,796. (No model.)

*To all whom it may concern:*

Be it known that I, HOWARD DIEUDONNÉ LORIA, engineer, a citizen of the Republic of France, and a resident of Orchamps, Jura, France, have invented certain new and useful Improvements in and Connected with Friction Clutches or Couplings; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention has reference to improvements in and connected with friction clutches or couplings.

The improved clutches or couplings constructed according to the invention may be employed with large or small forces and in fixed or movable structures or vehicles or vessels—such, for example, as factories, boats, vehicles, motor-cars, &c.

My improved clutches or couplings present most important advantages compared with those hitherto known, of which advantages the following are the principal: The driving of said clutches is easy and requires only very slight power. It can be effected from a distance with the greatest ease, this allowing of centralizing at a single point the stopping and starting gear of apparatus, engines, or machinery requiring to be under the direction or control of one individual. The clutching or coupling action is effected in a progressive manner, the pressure between the friction parts increasing at first rapidly, then more and more slowly, until there is no longer any slip.

The coupling offers absolute safety, whatever may be the variations of the force transmitted, because as soon as slip tends to occur the locking of the friction clutching parts increases automatically until all slip has disappeared.

The uncoupling is very rapid.

The forces always equilibrate themselves automatically and perfectly in the apparatus in such manner that no part can be subjected to unwonted pressure and that no thrust is exerted upon the shafts or axles.

Friction is reduced to the minimum. The apparatus does not comprise delicate parts, but only simple and strong parts. It is therefore cheap to manufacture.

As, on the one hand, the clutching action is effected progressively and by reason of this fact there is no fear of shocks or roughly applied or too sudden forces, as, on the other hand, friction is slight, and as, finally, the parts of the apparatus are strong, the apparatus will work for a long period without deterioration or serious wear.

My improved clutches or couplings comprise two friction-cones having their ends of lesser diameter opposite each other, these cones being mounted upon the shaft, to be set in motion in such manner as to carry same with them in their rotation, but so as to be capable of longitudinal displacement thereon. On approaching each other these cones produce locking action upon two symmetrical conical bearing-faces which are in fixed or driving connection with the driving part or part from which the motion is to be transmitted, and thus produce the clutching action. The moving apart of the two cones effects the uncoupling or throwing out of gear. By means of an appropriate operating arrangement this moving together and apart may be effected under the action of the motive power to be transmitted itself when the coupling or clutch lever is operated. The only work which the operator will thus have to perform to couple or uncouple will consist in causing the above-mentioned arrangement to assume determined positions, the motive power itself then furnishing the necessary energy to effect the locking or release. The force which has thus to be exerted by the operator is therefore always relatively slight, and it may be reduced to *nil* if electric operating means be employed.

The invention will be readily understood with reference to the accompanying drawings, in which—

Figure 1 is a vertical section of one form of clutch made in accordance with my invention. Fig. 2 is a vertical section of a modified form of my improved clutch. Fig. 3 is a diagrammatic view of an arrangement for operating the clutch electrically from a distance.

Referring to Fig. 1, I will now describe, by way of example, one form of clutch made in accordance with my invention as applied in cases where it is required to couple with a driving-shaft a driven shaft arranged as a prolongation or continuation thereof; but it will be understood that the invention is not limited to such application nor to the exact details specified, which may be varied without departing from the spirit of the invention. To the extremity of the driving-shaft $a$ is keyed a recessed plate $c$, more fully hereinafter described. To this plate is fixed by means of bolts $c'$, so as to rotate with said plate, a part $b$, hereinafter called the "bearing-crown," upon which are formed two conical bearings $d$ and $e$ for the cones referred to later on. The driven shaft $f$, as before mentioned in this modification, constitutes a continuation of the driving-shaft $a$. Upon the driven shaft $f$ are mounted two cones $g$ and $h$, these being connected to the driven shaft by keys and grooves in such manner as to be capable of sliding upon it but to carry it with them in their rotation. The hubs or central portions of the cones are formed with internal threads $i\,j$, the thread on the one cone being of the opposite direction to that of the other. With these threads engages a rotatable collar $k$ or bush, hereinafter called the "coupling-collar," which is formed with external threads for this purpose. According as the coupling-collar turns in the one direction or the other it locks the cones $g$ and $h$ against the bearings $e$ and $d$ on the bearing-crown to produce the clutching action or moves them away from these bearings to effect the uncoupling. The coupling-collar $k$ is mounted upon a sleeve 30 on the driven shaft $f$, upon which sleeve it is free to turn; but its longitudinal movement upon this sleeve is prevented, on the one hand, by the flange 33, provided on the one end of the sleeve, and, on the other hand, by a washer 34, screwed to the other end of the sleeve. This sleeve is keyed upon the driven shaft $f$ by the key 31, upon which slides the hub of the cones $g$. The longitudinal displacement of the sleeve on the shaft is prevented, on the one hand, by its abutment against the end of this key 31, and, on the other hand, by its abutment against the end of the key 32, upon which slides the hub of the cone $h$. The following is one device adapted to this form of coupling for turning the coupling-collar $k$ in one direction or the other under the action of the motive power itself to produce coupling or uncoupling: The coupling-collar $k$ is provided with gear-teeth $l$, with which gear any desired number of pinions $m$, mounted upon the same number of shafts or spindles $n$. These shafts or spindles are mounted parallel to the driven shaft $f$ in suitable orifices or bearings provided at convenient distances apart around the respective cones, said shafts extending between the cones and projecting therethrough to receive the friction-wheels $p\,q$, hereinafter described.

The said spindles thus travel around with the cones when these rotate; but they are capable of sliding longitudinally therein. At the extremities of each of these shafts or spindles are keyed at a suitable distance apart conical friction-wheels $p\,q$. When the said shafts or spindles are moved in one direction—say to the right—the one set of friction-wheels bears upon a conical bearing-surface $r$, provided for the purpose in the recessed plate $c$. When, on the other hand, the said shafts or spindles are pushed in the other direction—say to the left—this set of friction-wheels $p$ quits the conical surface $r$, just mentioned, and the set of friction-wheels $q$ at the other end of said shafts or spindles bears against a fixed conical surface $s$, provided therefor. In order to couple the driving and driven shafts $a$ and $f$, the set of sliding spindles $n$ is moved to the right and the right-hand set of friction-wheels $p$ becomes forcibly applied against the conical surface $r$ in the recessed plate $c$ of the driving-shaft. As this shaft $a$ rotates while the cones $g$ and $h$ are motionless, the conical surface $r$ of the recessed plate $c$ sets the wheels $p$ in contact therewith, together with the set of shafts or spindles $n$ and the toothed pinions $m$ on said spindles, in rotation in such manner that these pinions by acting upon the gear-teeth $l$ of the coupling-collar $k$ cause this collar to turn so as to move the cones $g$ and $h$ toward each other and to apply them with a growing pressure upon their bearing-faces $e$ and $d$ on the bearing-crown $b$. These bearing-faces $e$ and $d$ in rotating therefore carry the cones $g$ and $h$ with them, and consequently the driven shaft $f$, at first slowly, then faster and faster, in proportion as the slip between the bearing-surfaces $e$ and $d$ on the bearing-crown and the cones $g$ and $h$ diminishes in consequence of the augmentation of the locking action. At the same time the speed of rotation of the set of sliding shafts $n$ upon their axes diminishes, because there is a retardation of the relative movement between the conical friction-surface $r$ of the recessed plate $c$ and these axes. Nevertheless this speed only becomes nil, and consequently the locking action only ceases to increase, when there is no longer relative movement between $p$ and $r$—that is to say, when the driven shaft has taken the same speed as the driving-shaft.

It will be seen from the foregoing explanation that the clutching action is absolutely progressive and is effected without shock. It is at the same time absolutely certain. In fact, if for any reason—such, for example, as an increase in the load of the driven shaft—slip should occur between the cones $g\,h$ and their bearings $e\,d$ on the bearing-crown there is immediately relative movement between the conical surface $r$ of this recessed plate $c$ and the axes of the set of sliding shafts $n$, so that this surface acts upon the friction-wheels $p$ of the sliding shafts to cause the toothed pinions $m$ on said sliding shafts to turn, and thus increase the locking action until the slip entirely ceases. The locking of the cones upon their bearings on the bearing-crown thus automatically regulates itself according to the resistance to be overcome. The only condition is that the set of wheels contacting with the bearing-surface of the recessed plate shall be applied with sufficient pressure against same to be set in rotation thereby whenever there is relatively movement between this surface and the axes of the sliding shafts. For uncoupling, the sliding shafts $n$ are moved to the contrary direction—say the left—so that the friction-wheels $p$ move away from the bearing-surface $r$ in the recessed plate, and the set of friction-wheels $q$ at the left of said sliding shafts are applied against the fixed surface $s$, provided for the purpose, as hereinbefore referred to. As long as the driven shaft $f$ turns, the left-hand set of wheels $q$ roll upon the fixed bearing-surface $s$, and the sliding shafts $n$ are thus caused to turn on their axes in the desired direction to cause the pinions $m$ on said sliding shafts and the coupling-collar $k$ to effect the movement apart of the cones $g\ h$. The result is a rapid, almost instantaneous, uncoupling. As soon as the driven shaft $f$ is at rest there is no longer any friction between the parts of the apparatus. The longitudinal movements of the sliding shafts $n$ necessary to effect the coupling and uncoupling may be produced by operating a suitable coupling-fork $t$ or device. When the uncoupling is effected, this fork $t$ may be kept by suitable means—such, for example, by the locking arrangement 18 and 19 represented in Fig. 3 and hereinafter described—in its extreme right-hand or uncoupled position, as shown in Fig. 1. In this case I preferably provide a collar $u$, hereinafter called the "sliding" collar, upon which the coupling-fork $t$, to hold said collar to the right, acts. I also preferably provide a second collar $v$, which is movable along the driven shaft $f$ under the action of the sliding collar $u$, just referred to, but which turns with the driven shaft $f$. This second collar $v$ itself holds to the right the inner arms $w$ of a set of rock-levers $w\ x$, equal in number to the sliding shafts, said levers being mounted upon the left-hand cone at suitable intervals around same, as at 29, the other or outer arm $x$ of each of said levers bearing against the rear face of each of the friction-wheels $c$ of the corresponding set. Thus when the coupling-fork $t$ is in the right-hand position the outer arms $x$ of the rocking levers $w\ x$ will hold the left-hand set of friction-wheels $q$, and consequently the sliding shafts $n$ and the opposite set of friction-wheels, in their extreme left-hand or uncoupled position. If now it is desired to couple, the coupling-fork $t$ is disengaged, so as to allow it to move toward the left. The result is that the second collar $v$, above referred to, ceases to exert pressure upon the rocking levers $w\ x$, and springs $y$, provided for the purpose, can now act to push the sliding shafts $n$ to the right, and thus to apply the right-hand set of friction-wheels $p$ against the surface $r$ to effect the coupling. The springs $y$, just mentioned, are fitted around the sliding shafts $n$. They each bear, on the one hand, against the left-hand cone $g$ and, on the other hand, against a washer 35 or other suitable device provided for the purpose on each sliding shaft. Their tension may be regulated by turning nuts $z$, also provided upon the shafts. Suitable orifices 2 are preferably formed in the coupling-crown $b$ to allow of readily effecting this regulation from the outside. These orifices at the same time lighten the coupling-crown. The number of the springs $y$, just mentioned, might be increased, if required, by causing them to act upon a ring 3, as shown in Fig. 2, which would replace the washers 35, above mentioned, and connect all the sliding shafts $n$ together. From the point of view of friction it is much preferable to employ the arrangement shown, in which the collar does not turn and is provided with journals which enter forked extremities of the coupling-fork $t$. As this sliding collar does not turn, it may advantageously be provided with a lubricating-cup and lubrication-orifices $28^n$, so that friction is very slight.

The conical uncoupling-surface $s$—namely, the fixed bearing-surface for the left-hand or uncoupling set of friction-wheels $q$, above mentioned—preferably constitutes a portion of the internal face of a kind of box or casing 7, which thus serves at the same time as a protection for the parts which project beyond the cone $g$ on this side. As all the rest of the mechanism is situated inside the coupling-crown $b$ and the recessed plate $c$, above mentioned, which, in fact, form a casing for same, it will be seen that the whole of the parts are well protected. By reason of the form adopted for the coupling-crown $b$ and recessed plate $c$ and of their method of attachment the one to the other they themselves present no projection capable of being dangerous in the course of working. They are preferably made of ovoid form, which imparts a very neat look to the whole arrangement.

The part box or casing 7 in the bearing-surface for the uncoupling set of friction-wheels as formed may be kept in place by any suitable support 6. In the modification just described this support may be conveniently constructed so as to be capable of being secured to the ground. In this case the box or casing 7 is preferably fixed to the support 6 in such manner that it shall be easy to detach it therefrom and withdraw it. This allows access to the parts situated inside the box or casing 7 without dismounting the support. All the other parts are readily accessible through openings 2 and $o$, preferably provided in the bearing-crown $b$ and recessed plate $c$.

Upon the internal face of the bottom of the box or casing 7 is preferably formed a cup 4 for collecting the lubricating-oil which would escape between the sliding collar $u$ of the coupling-fork $t$ and the second collar $v$, above referred to. The oil collected in the cup may run out through an orifice 5, provided for the purpose at the base of said cup. As the said sliding collar $u$ does not turn, it may be provided with an adjustable stop-screw 10, which by bearing against the box or casing 7, above mentioned, will limit the movement of the said sliding collar toward the right, and consequently the pressure of the left-hand sets of friction-wheels $q$ against their bearing-surface $s$ in said box or casing, for uncoupling. The adjustment of the screw-stop allows of regulating this pressure at will.

If when the uncoupling is effected the driven shaft $f$ continues to turn in consequence of the momentum of the parts which it actuates as the cones $g$ $h$ continue to move apart, a time comes when the right-hand cone $h$ in moving toward the right comes against the inner face of the right-hand set of friction-wheels $p$. It thus draws the sliding shafts $n$, together with the opposite or left-hand set of friction-wheels $q$, a little to the right. The left-hand friction-wheels $q$ then immediately cease to be in contact with their bearing-surface $s$, so that the sliding shafts $n$ cease to turn on their axes. The result is that the cones $g$ $h$ cease to move apart even if the rotating movement of the driven shaft $f$ should still continue for a moment.

According to another modification of my improved clutch (shown in Fig. 2) the arrangement of the right and left handed threaded coupling-collar $k$ may differ from that described in the preceding modification. According to the present modification this coupling-collar $k$ has internal right and left handed threads, as before, and is simply mounted upon corresponding external threads provided on the hubs $i$ $j$, carrying the cones $g$ $h$. The rocking levers $w$ $x$, before referred to, instead of being carried by the left-hand cone $g$ are then mounted upon a sleeve-like part 36, fixed on the driven shaft $f$. The general operation of this modification of apparatus is the same as with the first-described arrangement. (Shown in Fig. 1.) If at the moment of uncoupling when the cones $g$ $h$ have ceased to be in contact with their bearing-surfaces $e$ $d$ on the bearing-crown $b$ the driven shaft $f$ continues to turn, the cones continue to move apart. The left-hand cone $g$ then comes against the sleeve-like part 36, just mentioned, by which it finds itself arrested. The right-hand cone $h$, continuing its movement to the right, comes against the right-hand set of friction-wheels $p$ and draws the sliding shafts $n$ to the right, so as to move the opposite set of friction-wheels $q$ away from their bearing-surface $s$, as in the case of the first-described arrangement. Now with regard to the operation of the coupling-fork $t$ this can be effected from any desired point. Thus, for example, this fork can be operated from a distance through the intermediation of electrical means.

I will proceed to describe an electrically-operated apparatus for this purpose constructed in accordance with my invention. In this apparatus the coupling-fork $t$ is mounted upon a fixed shaft 11 so as to be capable of oscillating thereon. Beyond said fixed shaft 11 the fork is prolonged and connected to a bent bar 16, provided with a catch, which bar rests freely upon a suitable support 15. The bent bar is provided with an arm 13, which carries the armature 14 of an electromagnet 17, this electromagnet being thrown into the circuit of a battery 23 when the movable arm 26 of a commutator is brought against a contact 24. When this movable arm is brought, on the contrary, against another contact 25, the circuit of the battery is closed through another electromagnet 22. The armature 21 of the second electromagnet is carried by one of the arms of a lever 20, the other arm of which is provided with a catch 19, situated below the catch 18 of the bent bar 16, before referred to, and adapted to engage therewith, as hereinafter described. I will assume the parts to be in the coupling position, as shown in Fig. 3, the movable arm 26 of the commutator being supposed open. For uncoupling the commutator is closed upon the contact 24 of the first-mentioned electromagnet 17, so as to excite the same. This electromagnet then attracts its armature, which causes the coupling-fork to move to the right, and thus effect the uncoupling. At the same time the bent bar has moved toward the left and its catch 18 has passed the second catch 19 and dropped behind same. The two catches thus become engaged together, this preventing the fork returning to the left when the commutator is opened. To again effect coupling, the commutor is closed upon the second contact 25 to excite the second electromagnet. This latter attracts its armature and causes the second or lower catch 19 to descend, and thus disengage the upper catch 18, so that the fork is released and the springs $y$, fitted around the sliding shafts $n$ of the clutch, can act to push these shafts into the coupling position. As soon as the movement of the fork has been effected the circuit of the battery is opened by the operator bringing the arm of the commutator between its contacts. Preferably the connection between the coupling-fork $t$ and the bent bar 16 is effected through the intermediation of a spring 12 of sufficient strength not to be compressed when the armature of the first-mentioned electromagnet is attracted. When at the end of the uncoupling—that is to say, at the moment when the two catches 18 and 19 are hooked or engaged together— the right-hand cone $h$ of the clutch acts upon the right-hand set of friction-wheels $p$ to draw the sliding shafts $n$ to the right, the spring 12, interposed between the coupling-fork and the bent lever, allows the fork, notwithstanding the locking action of the catches 18 19, to move to the slight extent necessary.

What I claim, and desire to secure by Letters Patent, is—

1. In a friction clutch or coupling, the combination of a driven shaft, two friction-cones having their smaller ends opposite each other and slidable on said shaft, two symmetrical conical bearing-faces connected to the driven shaft, shafts carried by the cones and capable of sliding longitudinally, a fixed part, means for producing the longitudinal movements of these shafts, means for causing these shafts to turn in one direction under the action of the driving part when they are moved longitudinally in one direction, and in the other direction under the action of said fixed part when they are moved in the contrary direction, and means to produce the locking of the cones against the conical bearing-faces when the above-named shafts turn in one direction under the action of the driving part and to produce their unlocking when these shafts turn in the other direction, substantially as and for the purpose specified.

2. In a friction clutch or coupling, the combination of a driven shaft, two friction-cones having their smaller ends opposite one another and longitudinally slidable upon said shaft, a driving element, two symmetrical conical bearing-faces in rigid connection with the driving element, shafts carried by the cones and capable of sliding longitudinally, springs acting upon these shafts to push them in one direction, means for returning them in the other direction, a fixed part, means for causing these shafts to turn in one direction under the action of the driving element when they are moved longitudinally in one direction, and in the other direction under the action of a fixed part when they are moved in the contrary direction, and means to produce the locking of the cones against the conical bearing-faces when the above-named shafts turn in one direction under the action of the driving element, and to produce their unlocking when these shafts turn in the other direction, substantially as and for the purpose specified.

3. In a friction clutch or coupling, the combination of a driven element, two friction-cones having their smaller ends opposite one another and mounted upon said element and capable of moving longitudinally thereon, a driving element, two symmetrical conical bearing-faces in rigid connection with the driving element, shafts carried by the cones capable of sliding longitudinally, springs acting upon these shafts to push them in one direction, means to return them in the other direction, a fixed part, means to cause these shafts to turn in one direction under the action of the driving element when they are moved longitudinally in one direction, and in the other direction under the action of the fixed part when they are moved in the contrary direction, and means for producing the locking of the cones against the conical bearing-faces when the above-named shafts turn in one direction under the action of the driving element, and to produce their unlocking when these shafts turn in the other direction, substantially as and for the purpose specified.

4. In a friction clutch or coupling, the combination of a driven element, two friction-cones having their smaller ends opposite one another and mounted upon said element and capable of moving longitudinally thereon, a driving element, two symmetrical conical bearing-faces in rigid connection with the driving element, shafts carried by the cones and capable of sliding longitudinally, springs acting upon these shafts to push them in one direction, a fork and intermediate parts to return the shafts in the other direction, means for operating this fork from a distance, a fixed part, means for causing the shafts carried by the cones to turn in one direction under the action of the driving element when they are moved longitudinally in one direction, and in the other direction under the action of a fixed element when they are moved in the contrary direction, and means for producing the locking of the cones against the conical bearing-faces when the above-named shafts turn in one direction under the action of the driving element and to produce their unlocking when these shafts turn in the other direction, substantially as and for the purpose specified.

5. In a friction clutch or coupling, the combination of a driven element, two cones on said element and capable of moving longitudinally thereon, a driving element, two symmetrical conical bearing-faces in rigid connection with the driving element, shafts carried by the cones and capable of sliding longitudinally, springs acting upon these shafts to push them in the desired direction for coupling, a fork and intermediate parts to act upon the shafts to return them in the other direction, an electromagnet to actuate the fork in order to bring it and the intermediate parts into the uncoupling position, a locking arrangement to retain the fork in this latter position, an electromagnet to effect the unlocking in order to allow the fork to return into the coupling position, a fixed part, means for causing the said shafts to turn in one direction under the action of the driving element when they are moved longitudinally in one direction, and in the other direction under the action of a fixed part when they are moved in the contrary direction, and means for producing the locking of the cones against the conical bearing-faces when the above-named shafts turn in one direction under the action of the driving element and to produce their unlocking when these shafts turn in the other direction, substantially as and for the purpose specified.

6. In a friction clutch or coupling, the combination of a driven element, two friction-cones having their smaller ends opposite each other, mounted upon said element and capable of moving longitudinally thereon, a driving element, two symmetrical conical bearing-faces in rigid connection with the driving element, shafts carried by the cone and capable of sliding longitudinally, means for producing the longitudinal movements of these shafts, a conical wheel fixed to one of the extremities of each of said shafts, a conical surface in rigid connection with the driving element and against which press the above-named conical wheels when their shafts are moved in the direction for coupling, a second conical wheel fixed to the other extremity of each of said shafts, a fixed conical surface against which these latter conical wheels press when their shafts are moved in the direction for uncoupling and means to produce the locking of the cones against the conical bearing-faces when the said shafts turn in consequence of the contact of the first-mentioned wheels with the conical surface on the driving element, and to produce their unlocking when the shafts turn in the other direction in consequence of the contact of the last-mentioned wheels with the fixed conical surface, substantially as and for the purpose specified.

7. In a friction clutch or coupling, the combination of a driven element, two friction-cones having their smaller ends opposite each other, having threaded hubs and mounted upon said element, and capable of moving longitudinally thereon, a driving element, two symmetrical conical bearing-faces in rigid connection with the driving element, shafts carried by the cones and capable of sliding longitudinally, means to produce the longitudinal movements of these shafts, a fixed part, means to cause these shafts to turn in one direction under the action of the driving element when they are moved longitudinally in one direction, and in the other direction under the action of a fixed part when they are moved in the contrary direction, and a rotating collar or bushing having inverse threads geared to the above-named shafts and engaging with the threaded hubs of the above-named cones to produce the locking of these latter against the conical bearing-faces when the above-named shafts turn in one direction, and of producing their unlocking when the shafts turn in the other direction, substantially as and for the purpose specified.

8. In combination, a driven element, oppositely-directed cones longitudinally slidable on said element, a driving element, friction-surfaces thereon coöperating with said cones and means to simultaneously move the cones into engagement with the surfaces, substantially as and for the purpose specified.

9. In combination, a driven element, oppositely-directed cones longitudinally slidable thereon, a driving element, friction-surfaces coöperating with said cones and frictionally-actuated means to move said cones to and from said surfaces, substantially as and for the purpose specified.

10. In combination, a driven element, oppositely-directed cones having threaded hubs longitudinally movable thereon, a driving element, friction-surfaces carried by said driving element and coöperating with the cones, a collar engaging said hubs and frictionally-actuated means to rotate the collar to move the cones into and out of engagement with said surfaces, substantially as and for the purpose specified.

11. In combination, a driven element, oppositely-directed cones having threaded hubs longitudinally movable thereon, a driving element, friction-surfaces carried by said driving element and coöperating with the cones, a collar engaging said hubs, shafts slidably mounted in the cones, a fixed and a moving friction-surface to rotate the shafts and gearing between the shafts and collar, substantially as and for the purpose specified.

In testimony that I claim the foregoing as my invention I have signed my name in presence of two subscribing witnesses.

HOWARD DIEUDONNÉ LORIA.

Witnesses:
EDMOND FRIBOUNNE,
AUGUSTE FLAVRE.